United States Patent Office 2,719,132
Patented Sept. 27, 1955

2,719,132

POLYMERIZATION CATALYST AND METHACRYLIC ACID DIESTER COMPOSITIONS POLYMERIZED THEREWITH

Francis E. Schweitzer, Woodbury, N. J., assignor to E. I. du Pont de Nemours and Company, Wilmington, Del., a corporation of Delaware No Drawing. Application May 25, 1954,
Serial No. 432,326

16 Claims. (Cl. 260—17)

This invention relates to a new synergistic mixture of polymerization catalyst, a polymerizable monomeric methacrylic acid diester coating composition containing the synergistic mixture, and to a process of catalytically polymerizing methacrylic acid diester coating compositions at a low baking temperature to solvent-resistant finishes adequately free of color to permit use over a light colored, blonde or bleached wooden substrate.

Many of the well known organic polymerization initiators are substantially colorless in solution and promote adequate polymerization of monomeric methacrylic acid diesters at a low baking temperature to a colorless, transparent and solvent-resistant polymer, but the activity of these catalysts is generally too great even at room temperature to permit addition to the polymerizable composition more than 24 hours prior to application of the coating. Unless refrigerated, polymerizable compositions containing these organic polymerization initiators are not package-stable and they will body and gel on standing at room temperature.

The use of inorganic and organic salts of metals to catalyze polymerization of ethylenically unsaturated compounds is well known to the polymer art. The use of the inorganic salts of cobalt as a catalyst for polymerization of methacrylic acid diesters, which is particularly well known, causes the resulting polymer to be distinctly pink to red in color. A cobalt catalyzed dimethacrylate polymer is sufficiently colored that a 1 mil dry film applied over a light colored substrate results in an objectionably colored finish.

Certain of the inorganic salts of rare earth metals, such as the cerium salts, are adequately low in color to permit their use as a polymerization catalyst, providing the polymerization reaction can be carried out at relatively high temperature, i. e., in the order of 200° F. or higher. An effective concentration of the cerium salts which will promote adequate polymerization of methacrylic acid diesters at low baking temperatures, i. e., below 200° F., required in wood finishing, is impractically high and sufficient to cause detectable tinting in dry cured films 3 mils thick applied over a light colored substrate.

A significant proportion of wood finishing operations concerns white toned, light colored, blonde or bleached woods. With these pale furniture woods it is important that the finish applied thereover be free of objectionable color.

It is an object of this invention to provide a package stable polymerizable methacrylic acid diester composition curable at a low baking temperature to a solvent-resistant transparent finish which is colorless at a coating thickness of about 3 mils when applied over a light colored, blonde or color bleached substrate. Another object is to provide a method of catalytically curing a package stable polymerizable monomeric methacrylic acid diester composition at a low curing temperature whereby the resulting cured polymer composition is a solvent-resistant transparent finish, not detectably colored at a coating thickness of about 3 mils when applied over a light colored, blonde or color bleached substrate. These and other important objects will become readily apparent as the description of the invention proceeds.

These and other important objects are accomplished by incorporating in a liquid polymerizable composition comprising a monomeric methacrylic acid diester of an aliphatic dihydric alcohol a synergistic proportioned catalyst mixture comprising a soluble inorganic cobaltous salt and a soluble inorganic cerium(ous) salt, said catalyst mixture being present in an amount sufficient to provide for each 100 parts of film-forming non-volatile content of said polymerizable composition, from .02 part to .08 part of cobalt, from 0.20 to 1.00 part of total cobalt and cerium, calculated as metal, the ratio of cerium to cobalt being in the range of about 5 to 20 parts of cerium for each part of cobalt, and heating the composition at a temperature not exceeding about 180° F. for a time period sufficient to effect a degree of cure corresponding to that attained during a curing cycle of 90 minutes at 130° F. The invention does not exclude the use of colorless auxiliary organic polymerization initiators, in amounts insufficient to initiate polymerization of the monomeric methacrylic acid diester upon storage at room temperature, in combination with the synergistic mixture of soluble cobaltous and cerium(ous) salts to further accelerate the rate of cure.

By the term "colorless" as used throughout the specification and claims is meant an indetectable amount of color, as seen by the naked eye, in a dry cured film not exceeding 3 mils in thickness.

In order that one skilled in the art may better understand the invention, the following examples are given by way of illustration and not by way of limitation. All parts are expressed on a weight basis unless otherwise designated.

EXAMPLE I

*Wood finishing composition*

| | Parts by weight |
|---|---|
| Cellulose nitrate | 13.5 |
| Butyl alcohol (dehydration alcohol for cellulose nitrate) | 5.8 |
| Monomeric dimethacrylate of triethylene glycol | 13.5 |
| Ethyl acetate | 22.2 |
| Butyl acetate | 19.3 |
| Anhydrous 2B denatured ethyl alcohol | 10.1 |
| Xylol | 13.5 |
| 10% solution of cobaltous nitrate-hexahydrate in anhydrous ethyl alcohol (2B formula) | 0.5 |
| 10% solution of cerium(ous) nitrate-hexahydrate in anhydrous ethyl alcohol (2B formula) | 1.6 |
| | 100.0 |

The catalyst concentration in Example I consists of .038 part of cobalt and 0.192 part of cerium, calculated as metal, for each 100 parts of non-volatile content.

The cellulose nitrate was a butyl alcohol dehydrated conventional lacquer type, soluble in ester solvents, and further characterized by a viscosity equivalent to about 33 centipoises when measured at 25° C. using Consistency Formula A of A. S. T. M. Designation D–301–33.

The monomeric methacrylic acid diester of triethylene glycol was prepared by an ester interchange reaction between monomeric methyl methacrylate and triethylene glycol in which a large excess of methyl methacrylate was introduced into the glycol charge at a high rate with the unreacted methyl methacrylate serving as a volatile carrier for the by-product methyl alcohol as rapidly as it is formed in the exchange reaction, thereby rapidly and efficiently converting the triethylene glycol to its dimethacrylate ester. The monomer contained 25 p. p. m. of hydroquinone as stabilizer.

The lacquer solvents and diluents were substantially free of water, each having a dryness of at least 19 to 1, that is, one volume of solvent was miscible with at least 19 volumes of 60° A. P. I. gasoline without turbidity at 20° C. This test is a standard test for water content and is identified by A. S. T. M. Designation D–268–42. The butyl alcohol appearing in the formula as dehydration alcohol for the cellulose nitrate does not conform with this dryness limitation. The water content of the butyl alcohol used as the dehydration alcohol of commercially available cellulose nitrate corresponds to about 2 pounds for each 100 pounds of dry cellulose nitrate.

The composition of Example I was sprayed on a milk-white glass panel in several coats to provide a dry film thickness of about 3 mils and the coating was dried and cured by heating the panel in an oven for 90 minutes at a temperature of 130° F. The cured coating had no detectable color, was tack-free, hard and transparent. The cured film was not attacked, softened or dissolved by contact with either ethyl alcohol, or the mixture of volatile solvents in the composition of Example I.

In another test, two separate oak panels were filled with a white pigmented wood filler. One of the panels was surface coated with the composition of Example I. The other panel was coated with a similar composition (control) differing from that given in Example I in that the cerium nitrate catalyst was omitted and the cobalt nitrate catalyst solution increased from .5 part to 4.0 parts in order to provide a degree of cure which results in a solvent-resistant coating. The surface coatings were applied in amount to deposit a dry film thickness of 3 mils. The surface coatings were cured by heating for 60 minutes in an oven at 150° F. Both cured coatings were resistant to ethyl alcohol and the mixture of solvents in Example I and were equivalent in other physical properties except for color. The control panel (without cerium nitrate catalyst) was distinctly pink in color over the white-filled areas of the wood. The finish of Example I composition was uniform in appearance and it did not appear to be detectably colored over the white areas. The shorter curing cycle at 150° F. was adequate to polymerize the coatings to a solvent-resistant condition.

EXAMPLE II

*Wood finishing composition*

| | Parts by weight |
|---|---|
| Cellulose nitrate | 15.7 |
| Ethyl alcohol (dehydration alcohol for cellulose nitrate) | 8.5 |
| Monomeric dimethacrylate composition | 24.8 |
| Alkyd resin solution | 7.5 |
| Methyl ethyl ketone | 5.0 |
| Ethyl acetate | 10.0 |
| Butyl acetate | 15.0 |
| Xylol | 5.0 |
| Anhydrous ethyl alcohol | 1.3 |
| 10% solution of cobaltous nitrate-hexahydrate in anhydrous ethyl alcohol (2B formula) | 1.0 |
| 10% solution of cerium(ous) nitrate-hexahydrate in anhydrous ethyl alcohol (2B formula) | 6.2 |
| | 100.0 |

The catalyst solutions in the above composition provide equivalently about 0.045 part of cobalt and 0.445 part of cerium for each 100 parts of the non-volatile components. The total metal content was 0.50 part on the same basis.

The monomeric dimethacrylate composition was a mixture of methacrylic acid diesters obtained by esterification of a mixture of glycols having an average molecular weight of about 200 and characterized by the empirical formula $HO(-CH_2-CH_2-O)_nH$, where $n$ is an integer generally in the range of 1 to 20, the predominating proportion of the mixture being represented by a mixture of diethylene glycol, triethylene glycol, tetraethylene glycol, pentaethylene glycol and hexaethylene glycol. A mixed glycol of this type is commercially available as Polyethylene Glycol 200.

The alkyd resin solution was a 55% oil length castor oil modified glyceryl phthalate resin at 60% non-volatile content in a mixture of 90 parts high solvency petroleum naphtha lacquer diluent and 10 parts of butyl alcohol.

The composition of Example II was sprayed on an unstained maple panel to provide a dry film thickness of about 3 mils and cured by heating the coated panel in an oven for 60 minutes at 150° F. The cured coating over the maple substrate was not detectably colored. It was sufficiently free of color to permit its use over other blonde furniture wood substrates. The cured film was comparable in solvent resistance to that of Example I.

The minimum amount of cobalt as cobaltous nitrate-hexahydrate used alone, which will result in an adequate cure of the monomeric methacrylic acid diester compositions of this invention is about .15 part per 100 parts of non-volatile film-forming components when the compositions are cured at 180° F., the maximum temperature commonly used for wooden substrates. This minimum amount of cobalt is twice the maximum amount permissible to prepare colorless finishes 3 mils thick.

The corresponding minimum amount of cerium as cerium(ous) nitrate-hexahydrate to produce an adequate cure is 1.0 part of cerium per 100 parts of non-volatile film-forming components. This minimum amount of cerium is also greater than the maximum amount permissible to prepare colorless finishes 3 mils thick.

When the amount of cobalt or cerium salt, used alone, is reduced to a point where colorless films can be produced the baked films are not completely cured and are softened by ethyl alcohol or a mixture of solvents in the coating composition of Examples I and II.

It was surprising and unexpected that it is possible to cure a monomeric methacrylic acid diester coating composition to a solvent-resistant state with an amount of a synergistic mixture of cerium and cobalt salts which is less than the amount that produces a detectable color in a dry film 3 mils thick.

Equally satisfactory results are obtained when a 10% solution of cobaltous chloride-dihydrate ($CoCl_2 \cdot 2H_2O$) in anhydrous ethyl alcohol is substituted (part for part) for the cobalt salt portion of the mixed salt catalyst of Examples I and II. An important consideration in the substitution of cobaltous chloride-dihydrate for cobaltous nitrate-hexahydrate is that 1 part of the chloride salt supplies .355 part of cobalt whereas 1 part of the nitrate salt supplies only .203 part of cobalt. Hence the substitution should preferably be made on the basis of the metal content of the salt. Cobaltous sulfate may likewise be used in place of the nitrate salt.

While the nitrate is the preferred soluble cerium(ous) salt in the practice of this invention, hydrated cerium(ous) salts of hydrochloric acid, sulfuric acid and orthophosphoric acid are likewise operative and may be substituted on an equivalent weight basis of the cerium metal content of the salt for the cerium(ous) nitrate-hexahydrate specified in the examples.

Where pot-life of the coating composition is not an important consideration in the use of the liquid composition, the polymerization may be further accelerated by incorporating an organic polymerization catalyst in combination with the synergistic mixture of cobalt and cerium salts immediately prior to use of the composition. Since these auxiliary catalysts are detrimental to the package or pot stability of the liquid unpolymerized composition; they are preferably used at a concentration not exceeding 0.1 part for each 100 parts of liquid coating composition.

When 0.1 part of benzol peroxide was added to the compositions of Examples I and II, the respective coatings polymerized overnight at room temperature of about 77° F. to a solvent-resistant state. The same degree of curing was reached when the coatings were heated for 45 minutes at 130° F. In the absence of the benzoyl peroxide, the coatings did not polymerize at room temperature to a solvent-resistant state and a curing cycle of 90 minutes at 130° F. was necessary to reach said degree of polymerization.

Other auxiliary organic polymerization catalysts that may be employed in place of benzoyl peroxide include lauroyl peroxide, alpha-alpha′ dimethylbenzylhydroperoxide, tertiary butyl perbenzoate, alpha-alpha′ azo-diisobutyronitrile and alpha-alpha′ azo-bis (alpha-gamma dimethylvaleronitrile).

While the examples, for the sake of undue repetition, are directed to preferred compositions containing cellulose nitrate as a preferred polymeric modifier for the methacrylic acid diester, the cellulose nitrate may be replaced with a like amount or a lesser amount of a soluble linear organic polymer which is compatible with said diester in its cured state. Suitable modifying polymers include, in addition to cellulose nitrate, the following: cellulose acetate, cellulose propionate, cellulose acetate/butyrate, cellulose acetate/propionate, ethyl cellulose, polymethyl methacrylate, butyl methacrylate polymer, ethyl acrylate polymer, vinyl acetate polymer, vinyl chloride/vinyl acetate copolymers, alkyd resins and glycol/terephthalic acid resins. The molecular weight of the polymeric modifier is not particularly critical, but the preferred molecular weight is in the range of 10,000 to 150,000. It is also preferred that the total content of polymeric modifiers for the monomeric diester does not exceed the content of the diester.

The monomeric methacrylic acid diesters of the particular polyethylene glycols cited in the examples may be replaced with other individual species or mixtures thereof in which the average molecular weight of the glycol is in the range of about 100 to 300. These glycols may be replaced in part or wholly by still other saturated aliphatic dihydric alcohols characterized by the empirical formula $HO(-CH_2-)_nOH$ where $n$ is an integer and the molecular weight is preferably less than 200. Included in this class are ethylene glycol, propylene glycol, butylene glycol, pentamethylene glycol, and hexamethylene glycol. The methacrylic acid diesters of polypropylene glycols may be substituted directly for polymerizable diesters in the examples, said glycols having a molecular weight not exceeding about 300. Higher molecular weight dihydric alcohols esterified with methacrylic acid do not provide diesters which polymerize to an adequate degree of hardness for surface coatings.

Monomeric non-volatile modifiers for the methacrylic acid diester may be used with or without the presence of a polymeric modifier. Modifiers of this type include plasticizers such as dibutyl phthalate, tricresyl phosphate, diphenyl phthalate, and butyl phthalyl butyl glycolate.

The mixed salt catalyst of this invention is also effective in the polymerization of unmodified monomeric methacrylic acid diester in bulk or in solution in an organic solvent.

The preferred compositions for coating purposes have a non-volatile content in the range of about 10 to 50%, the content of volatile solvent and diluent being preferably at least 50%. The nature of the solvent is not generally critical; any one of the conventional volatile lacquer solvents such as esters and ketones may be used. Typical examples of suitable solvents include ethyl acetate, propyl acetate, isopropyl acetate, butyl acetate, isobutyl acetate, amyl acetate, pentacetate, hexyl acetate, cyclohexyl acetate, methyl ethyl ketone, methyl isobutyl ketone, cyclohexanone, and acetone. Alcohols, such as ethyl alcohol, isopropyl alcohol and butyl alcohol are suitable diluents. The water-miscible alcohols facilitate the solution of the soluble cobaltous and cerium(ous) salts. Hydrocarbon diluents may also be included in the composition; the aromatic hydrocarbons, such as toluol and xylol, being preferred over the petroleum hydrocarbons. The high solvency petroleum naphthas which have as high aromatic equivalency are also useful. In the particularly preferred embodiment of the invention wherein the methacrylic acid is in combination with low viscosity lacquer type cellulose nitrate, volatile ester solvents are preferred as they provide optimum clarity in the cured coating.

While the invention is directed to the provision of transparent, colorless coating compositions, the synergistic mixture of soluble inorganic cobalt and cerium salts is also useful in promoting the polymerization of methacrylic acid diesters of saturated aliphatic dihydric alcohols where color and transparency are not pertinent factors. In such cases, the coating composition may include pigments, dyes, extenders and fillers which are commonly used in coating compositions. The advantage of the synergistic mixture of salts is minimized in the dark or opaque compositions. The cobalt salt, on an equal weight basis, is more effective than the cerium salt. The cooperative effect of the salt mixture is a practical advantage when the cobalt, on a metal basis, is present at a concentration ranging from about 0.02 part to 0.08 part for each 100 parts of non-volatile content and the cerium is present in an amount corresponding to that which provides a combined content of cobalt and cerium in the range of 0.20 to 1.00 part for each 100 parts of non-volatile content of the composition. The preferred ratio of cerium to cobalt is in the range of 5 to 10 parts for each part of cobalt and the operative range is 5 to 20.

The compositions of this invention polymerized in the presence of the synergistic mixture of cobalt and cerium salts provides a commercial advantage over prior art compositions which were not sufficiently free of color for utility over white, bleached, or light colored substrates.

It is apparent that many widely different embodiments of this invention can be made without departing from the spirit and scope thereof, and, therefore, it is not intended to be limited except as indicated in the appended claims.

I claim:

1. A polymerizable liquid coating composition comprising a polymerizable monomeric methacrylic acid diester of a saturated dihydric alcohol, said alcohol having a molecular weight in the range of about 100 to 300, as a polymerization initiator for said diester an inorganic cobaltous salt having an anion selected from the group consisting of nitrate, chloride and sulfate, and a cerium(ous) salt having an anion selected from the group consisting of nitrate, chloride, sulfate and orthophosphate, the said salts being present in an amount corresponding to that which will supply a total content of cobalt and cerium in the range of 0.20 to 1.00 part, calculated as metal, for each 100 parts of non-volatile content of said polymerizable composition, the cobalt representing 0.02 to 0.08 part and the ratio of cerium to cobalt being in the range of about 5 to 20 for each part of cobalt.

2. The composition of claim 1 wherein said non-volatile content of the coating composition comprises said monomeric methacrylic acid diester and a soluble linear organic polymer compatible therewith.

3. The composition of claim 1 wherein said liquid coating composition comprises said monomeric methacrylic acid diester, a soluble linear organic polymer compatible therewith and at least one volatile organic solvent for said polymer and said monomer.

4. The composition of claim 3 wherein said linear organic polymer is cellulose nitrate.

5. The composition of claim 3 wherein said monomeric methacrylic acid diester is present in an amount corresponding to at least about 50% by weight of the non-volatile content of the liquid coating.

6. The composition of claim 1 wherein said monomeric methacrylic acid diester is the diester of triethylene glycol.

7. The composition of claim 1 wherein said monomeric diester is the esterification product of methacrylic acid and a mixture of dihydric alcohols having the empirical formula $HO-(CH_2-CH_2-O)_n-H$ where $n$ is an integer in the range of 1 to 20.

8. A polymerizable liquid coating composition comprising about equal proportions of a monomeric methacrylic acid diester of a saturated aliphatic dihydric alcohol and cellulose nitrate, said dihydric alcohol having a molecular weight in the range of about 100 to 300, a volatile solvent for said cellulose nitrate, a polymerization initiator for said monomeric diester comprising a mixture consisting of about .05 part of cobaltous nitrate-hexahydrate and about 0.16 part of cerium(ous) nitrate-hexahydrate.

9. A method of curing a polymerizable composition comprising a monomeric methacrylic acid diester of a saturated aliphatic dihydric alcohol, said alcohol having a molecular weight in the range of about 100 to 300, to a solvent-resistant, transparent and substantially colorless polymer composition, the freedom of color in the polymer composition being measured at about 3 mils thickness of film, which comprises the steps of adding to said composition as polymerization initiators an inorganic cobaltous salt having an anion selected from the group consisting of nitrate, chloride and sulfate, and an inorganic cerium(ous) salt having an anion selected from the group consisting of nitrate, chloride, sulfate and orthophosphate, said salts being present in an amount corresponding to a total content of cobalt and cerium, calculated as metal, in the range of 0.20 part to 1.00 part for each 100 parts of non-volatile content of said polymerizable composition, the cobalt being present in an amount corresponding to 0.02 to 0.08 part on said basis and the ratio of cerium to cobalt being in the range of 5 to 20 parts for each part of cobalt, and heating the composition at a temperature up to about 180° F. for a time period equivalent to a curing cycle of 90 minutes at 130° F.

10. The method of claim 9 which includes an additional step of adding up to 0.1 part of an auxiliary organic polymerization initiator for each 100 parts of non-volatile content of said composition within a 24 hour period prior to heating the composition, said organic initiator being soluble, substantially colorless in solution at said concentration and capable of polymerizing monomers having a $CH_2=C<$ group.

11. The composition of claim 1 which includes an auxiliary organic polymerization initiator in an amount up to 0.1 part for each 100 parts of non-volatile content, said auxiliary initiator being soluble, substantially colorless at said concentration and capable of polymerizing monomers having a $CH_2=C<$ group.

12. The composition of claim 11 wherein said auxiliary initiator is an organic peroxide.

13. An article of manufacture comprising a wooden substrate surface coated with a substantially colorless composition comprising a polymerized methacrylic acid diester of a saturated aliphatic dihydric alcohol and an inorganic cobalt salt having an anion selected from the group consisting of nitrate, chloride and sulfate, and an inorganic cerium salt having an anion selected from the group consisting of nitrate, chloride, sulfate and orthophosphate, the cobalt salt being present in an amount corresponding to .02 to .08 part of cobalt, on a metal basis, for each 100 parts of non-volatile film-forming composition, and the cerium salt being present in an amount corresponding to a cerium to cobalt ratio in the range of 5 to 20 parts for each part of cobalt, the total content of cobalt and cerium being in the range of 0.20 part to 1.00 part on said basis, freedom from color in said polymerized coating being measured at about 3 mils film thickness.

14. The article of claim 13 wherein said substrate is a naturally dark colored wood bleached to a blonde color.

15. The article of claim 13 wherein said substrate is a naturally colored, open grained wood the surface exposed porous structure of which is filled with a contrasting light colored wood filler.

16. As a new catalyst combination a synergistic mixture of an inorganic cobaltous salt having an anion selected from the group consisting of nitrate, chloride and sulfate and an inorganic cerium(ous) salt having an anion selected from the group consisting of nitrate, chloride, sulfate and orthophosphate, said salts being present in an amount corresponding to a cerium to cobalt ratio, on a metal basis, in the range of 5 to 20 parts of cerium for each part of cobalt.

References Cited in the file of this patent

UNITED STATES PATENTS

| | | |
|---|---|---|
| 2,129,694 | Izzard | Sept. 13, 1938 |
| 2,485,535 | Park | Oct. 18, 1949 |
| 2,516,064 | Marks | July 18, 1950 |
| 2,522,254 | Chenicek | Sept. 12, 1950 |